(12) United States Patent
Humphries et al.

(10) Patent No.: US 6,290,450 B1
(45) Date of Patent: Sep. 18, 2001

(54) UNIVERSAL ADJUSTABLE WRECKER BODY SUB-FRAME AND BODY PANEL ASSEMBLIES

(75) Inventors: David F. Humphries; Christopher N. Goetz, both of Greencastle, PA (US)

(73) Assignee: Jerr-Dan Corporation, Greencastle, PA (US)

( * ) Notice: Subject to any disclaimer, the term of this patent is extended or adjusted under 35 U.S.C. 154(b) by 0 days.

(21) Appl. No.: 09/659,553

(22) Filed: Sep. 11, 2000

Related U.S. Application Data

(62) Division of application No. 09/134,895, filed on Aug. 17, 1998, now Pat. No. 6,120,235.

(51) Int. Cl.$^7$ .................................................. B62D 21/04
(52) U.S. Cl. ............................................................ 414/563
(58) Field of Search ..................... 414/563; 296/26.12, 296/26.13, 183, 37.6; 280/656

(56) References Cited

U.S. PATENT DOCUMENTS

| | | | |
|---|---|---|---|
| 2,491,004 | * 12/1949 | Holand | 280/656 |
| 3,245,714 | * 4/1966 | Blair | 296/26.13 |
| 3,330,574 | * 7/1967 | Kulyk | 280/656 |
| 3,797,880 | * 3/1974 | Pezzaglia | 296/26.13 |
| 3,888,368 | 6/1975 | Hawkins . | |
| 4,117,942 | 10/1978 | Olsen et al. . | |
| 4,119,224 | * 10/1978 | Moody | 280/656 X |
| 4,412,699 | 11/1983 | Peruzzi . | |
| 4,441,851 | 4/1984 | Starkweather . | |
| 4,473,334 | * 9/1984 | Brown | 414/563 |
| 4,570,967 | * 2/1986 | Allnut | 280/656 |
| 5,249,823 | * 10/1993 | McCoy et al. | 280/656 |
| 5,267,773 | * 12/1993 | Kalis, Jr. et al. | 296/183 |

FOREIGN PATENT DOCUMENTS

| | | | |
|---|---|---|---|
| 3405259 | * 2/1984 | (DE) | 280/656 |
| 2498149 | 7/1982 | (FR) . | |
| 2209714 | * 5/1989 | (GB) . | |

* cited by examiner

*Primary Examiner*—D. Glenn Dayoan
*Assistant Examiner*—Lori L. Coletta
(74) *Attorney, Agent, or Firm*—McDermott, Will & Emery

(57) ABSTRACT

An adjustable body sub-frame assembly that mounts on a truck chassis, and an adjustable body panel assembly that mounts on the body sub-frame assembly. The body sub-frame assembly includes left and right sub-frame rails that mount on respective truck chassis rails. Each sub-frame rail includes sub-frame brace tubes and body support brackets. The sub-frame brace tubes are fixed to the sub-frame rails extending laterally inward from the truck chassis rails, and the body support brackets are fixed to the sub-frame rails extending laterally outward from the truck chassis rails. The body sub-frame assembly further includes sub-frame brace sleeves that receive corresponding sub-frame brace tubes of the sub-frame rails. The sub-frame brace tubes can be welded at different positions within the sub-frame brace sleeves providing for adjustability in the width of the body sub-frame assembly. The body panel assembly includes left and right body panels. Each body panel includes mounting brackets fixed thereto extending laterally inward. Each mounting bracket of each body panel aligns with a corresponding body support bracket of the corresponding sub-frame rail. Each body panel mounts on the support brackets of the corresponding sub-frame rail in a plurality of lateral positions providing for adjustability in the width of the body panel assembly. The body panel assembly further includes length spacer panels cut to size to provide for adjustability in the length of the body panel assembly.

15 Claims, 4 Drawing Sheets

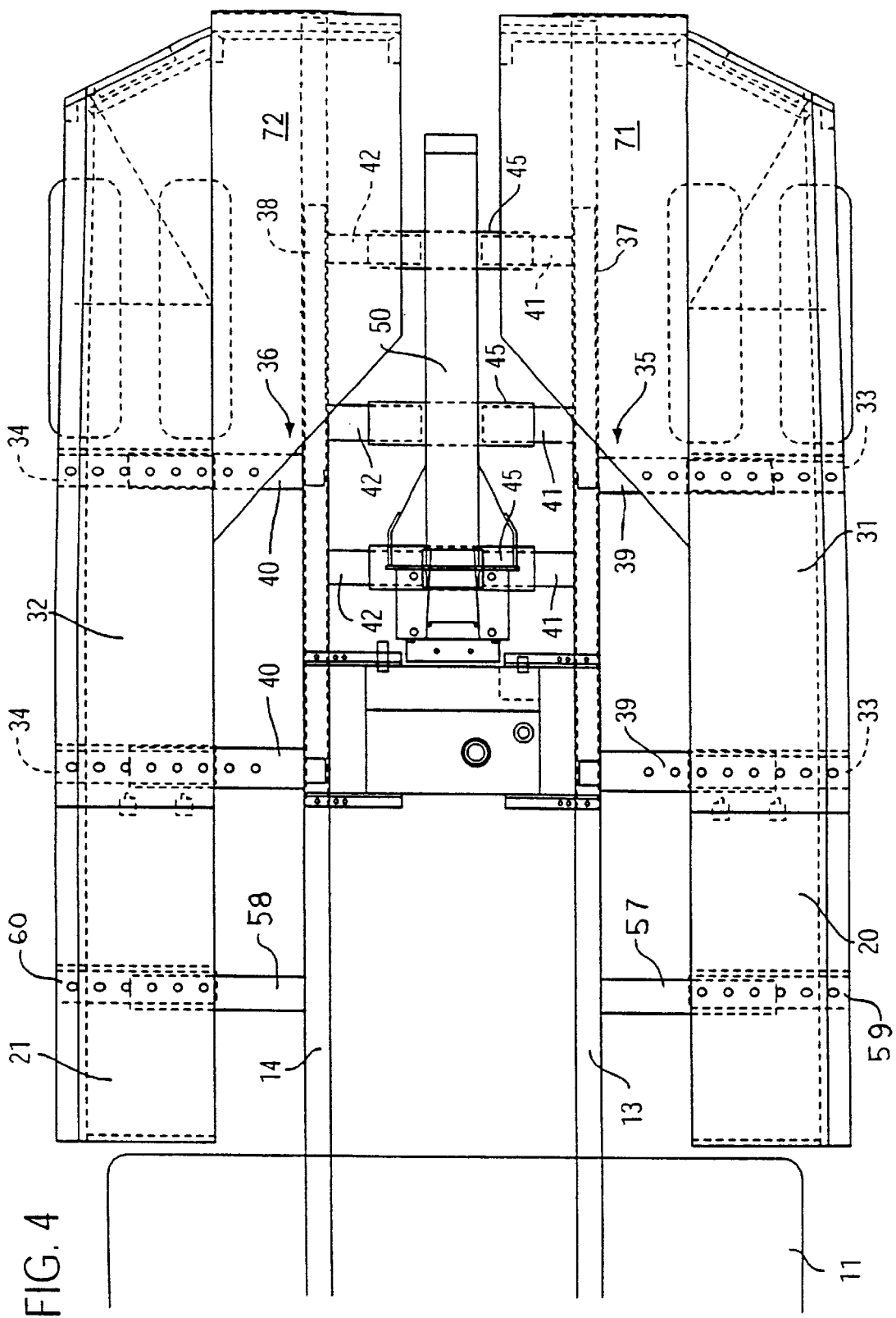

UNIVERSAL ADJUSTABLE WRECKER BODY SUB-FRAME AND BODY PANEL ASSEMBLIES

This application is a divisional of application Ser. No. 09/134,895 filed Aug. 17, 1998 now U.S. Pat. No. 6,120,235.

BACKGROUND OF THE INVENTION

The present invention relates to an adjustable body sub-frame assembly and an adjustable body panel assembly for a truck chassis, such as a wrecker or the like.

Truck chassis with custom body assemblies are well known in certain industries (i.e. the wrecker and car carrier industries). A body assembly typically comprises a left body panel and a right body panel, and typically includes storage compartments for tools and supplies. The body assembly makes up the structural truck body that covers the chassis and drive train. An example of a truck chassis with an attached body assembly that is typical of the prior art is U.S. Pat. No. 5,267,773 to Kalis, Jr. et al. (Kalis). Kalis shows a body assembly that is formed from metal panels that are welded together and then bolted to the truck chassis.

Truck chassis are available in various different standard sizes (width and length) depending on the country of origin. For example, the United States truck manufacturers generally produce two standard truck chassis widths suitable for a wrecker, 34" and 37.5", and the Japanese and European manufacturers produce different standard chassis sizes. The body assembly width that a given chassis can accommodate is governed by the chassis width, in combination with the cab width and width between the outermost rear wheels (i.e. depending on the size of the rear wheels, and whether the chassis includes two or four rear wheels). Each different chassis width, therefore, accommodates a different range of body assembly widths. Further, to mount a desired body on a given chassis, the body must include a frame with a width that matches the width of the chassis. Chassis lengths also vary, which in turn governs the length of a body assembly that can be accommodated by a given chassis. Therefore, each body assembly must be produced with specific dimensions depending on the particular chassis for which the body assembly is designated.

Accordingly, manufacturers must produce different body assemblies for the various different chassis sizes. Factories must then either expand manufacturing capabilities to facilitate simultaneous production of the different body assemblies, or re-tool their manufacturing lines to switch between body assembly sizes. Factories must also increase their parts inventories to accommodate the different body assembly sizes, and distributors, to the extent that they stock body assemblies, must increase their inventories. The prior art, therefore, presents several drawbacks, including increased manufacturing tooling costs, increased factory and distributor inventory requirements, and increased manufacturing lead times.

The present invention overcomes the drawbacks of the prior art by providing an adjustable body sub-frame assembly for mounting on a truck chassis, and an adjustable body panel assembly for mounting on the body sub-frame assembly. One universal, adjustable body sub-frame assembly and one universal, adjustable body panel assembly of the present invention fit virtually any truck chassis. The present invention thereby reduces the manufacturing capability and inventory requirements associated with multiple body sub-frame and body panel assembly sizes.

SUMMARY OF THE INVENTION

The adjustable body sub-frame assembly of the present invention mounts an the chassis rails of a truck chassis. The body sub-frame assembly comprises left and right sub-frame rails that mount on left and right truck chassis rails, respectively. Each sub-frame rail includes a plurality of sub-frame brace tubes, and a plurality of body support brackets. Each sub-frame brace tube is fixed to a respective sub-frame rail in a lateral direction extending inward from the respective truck chassis rail, and each body support bracket is fixed to a respective sub-frame rail in a lateral direction extending outward from the respective truck chassis rail. Further, each body support bracket has a series of holes at a predetermined spacing along its length.

The body sub-frame assembly further comprises a plurality of sub-frame brace sleeves, each having two open ends. Each sub-frame brace sleeve receives a corresponding sub-frame brace tube of the left sub-frame rail in one open end, and receives a corresponding sub-frame brace tube of the right sub-frame rail in the other open end. The sub-frame brace tubes are inserted a predetermined distance into the respective sub-frame brace sleeves to a position such that each sub-frame rail aligns with the respective truck chassis rail. The sub-frame brace tubes are then welded in the sub-frame brace sleeves at that position. Accordingly, the body sub-frame assembly is thereby being adjustable to fit truck chassis of various widths.

The adjustable body panel assembly of the present invention comprises left and right body panels. Each body panel includes a plurality of mounting brackets fixed thereto in a direction extending laterally inward from the inner side of the body panel, and each mounting bracket has a series of holes at a predetermined spacing along its length. Each mounting bracket of each body panel aligns with a corresponding body support bracket of the corresponding sub-frame rail. Each body panel can be mounted on the support brackets of the corresponding sub-frame rail in a plurality of lateral positions. In each such lateral position, a subset of the series of holes in each mounting bracket aligns with a subset of the series of holes in the corresponding body support bracket. The body panel assembly is thereby also adjustable to fit truck chassis of various widths.

Additionally, the body panel assembly of the present invention includes length spacer panels that are cut to size in accordance with a length of the truck chassis. A length spacer panel is mounted in a space between the front end of each of the left and right body panels and the truck cab located at the front end of the truck chassis. The length spacer panels thereby provide for mounting the body panel assembly of the present invention on truck chassis of various lengths.

The present invention provides advantages over the prior art by providing an adjustable body sub-frame assembly for mounting on a truck chassis, and an adjustable body panel assembly for mounting on the body sub-frame assembly. The body sub-frame assembly is adjustable in the width dimension, and the body panel assembly is adjustable in both the width and length dimensions, to fit chassis of varying sizes. The width adjustment of the body sub-frame assembly accommodates the truck chassis width, and the width adjustment of the body panel assembly accommodates the body sub-frame width, cab width, and width between the outermost rear wheels of the truck chassis. The length spacer panel accommodates variations in chassis length. The present invention thereby provides for one universal body sub-frame assembly and one universal body panel assembly that are adjustable to fit virtually any truck chassis.

BRIEF DESCRIPTION OF THE DRAWINGS

FIG. 4 illustrates a top view of the body panel assembly and body sub-frame assembly of an exemplary embodiment of the present invention, with integral deck plates.

DESCRIPTION OF THE PREFERRED EMBODIMENTS

Figure 1:
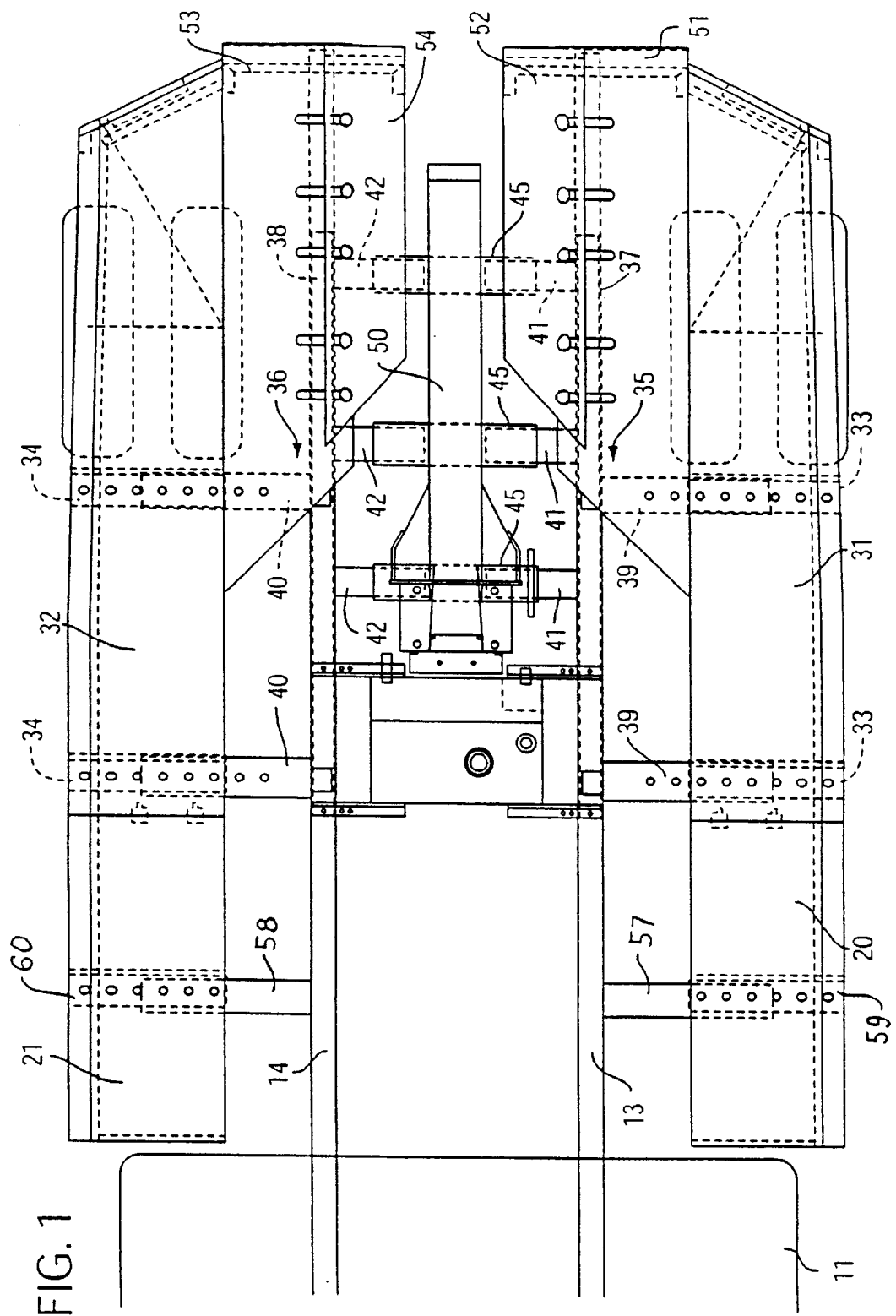
FIG. 1 illustrates a top view of the body panel assembly and body sub-frame assembly of an exemplary embodiment of the present invention, mounted on a wide truck chassis, with component deck plates.

FIG. 1 shows a top view of the body assembly and sub-frame assembly of an exemplary embodiment of the present invention. The body assembly comprises left and right body panels 31 and 32, each with a pair of mounting brackets 33 and 34, respectively. The left and right body panels mount on a body sub-frame assembly, which comprises left and right sub-frame members 35 and 36. Each sub-frame member comprises a sub-frame rail 37,38, a pair of body support brackets 39,40, and three sub-frame brace tubes 41,42. The left and right sub-frame members are held together as the body sub-frame assembly via three sub-frame brace sleeves 45. Except where expressly stated otherwise, the left and right body panels 31 and 32, and the left and right sub-frame members 35 and 36, are mirror images of each other.

Figure 2:
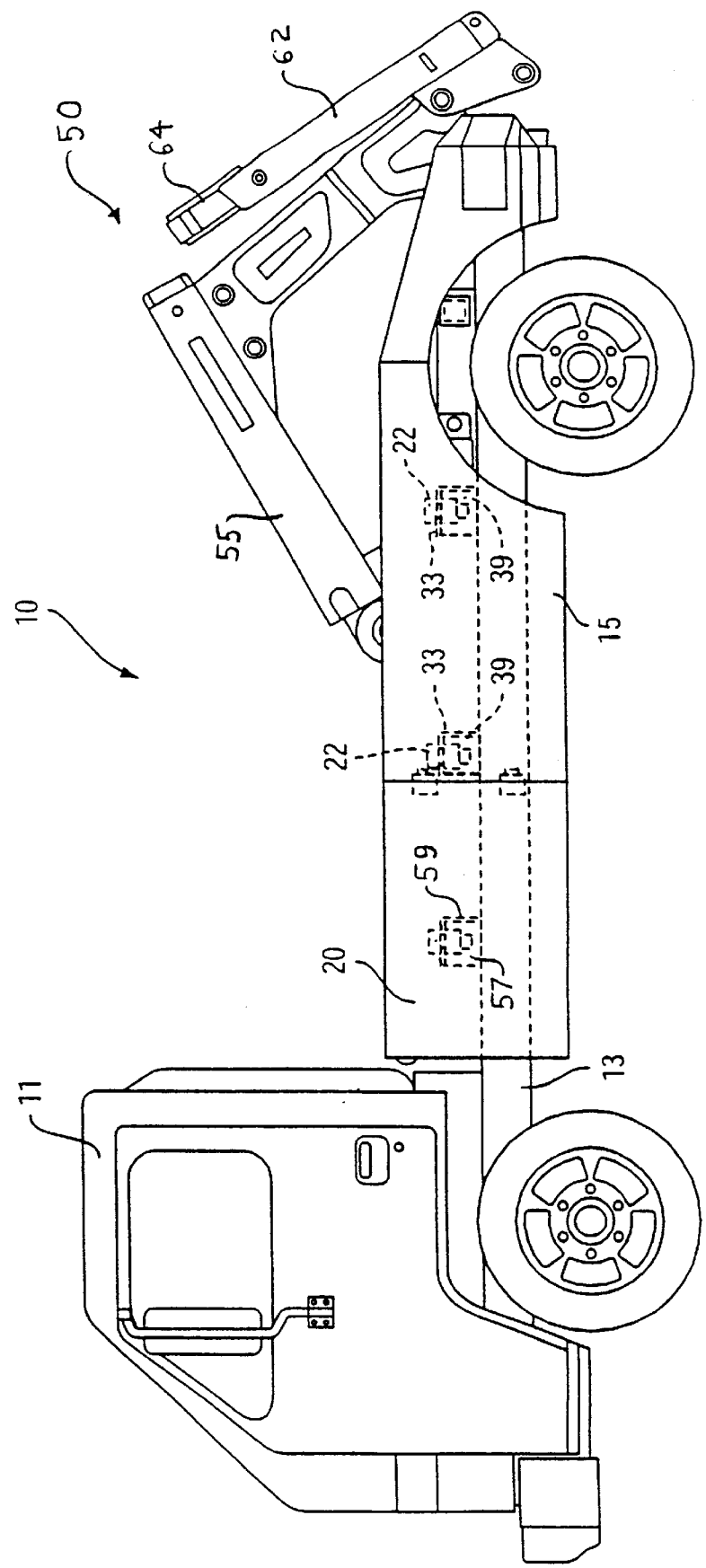
FIG. 2 illustrates a left side view of a wrecker with a body panel assembly and body sub-frame assembly in accordance with an exemplary embodiment of the present invention.

FIG. 2 shows a left side view of a wrecker 10 equipped with adjustable sub-frame and body panel assemblies in accordance with the exemplary embodiment of the present invention. The wrecker also includes a lift assembly for towing a disabled vehicle. A wide variety of different lift assembly embodiments can be employed with the adjustable sub-frame and body panel assemblies of the present invention, and following description illustrates one such embodiment. The wrecker comprises a chassis 12, with a cab 11 and lift assembly 50 mounted thereon. The lift assembly includes a main boom 55 pivotally mounted to the truck chassis with a hydraulic system (not shown) for raising, lowering, extending, and/or retracting the main boom 55. The lift assembly 55 further includes an extension boom 62 pivotally connected to the end of the main boom 55 with a hydraulic system (not shown) for rotating the extension boom 62 up and down. A wheel grid assembly 64 is attached at the end of the extension-boom 62 for engaging the front or rear wheels of a vehicle to be towed.

The body panel 15 includes the pair of mounting brackets 33, each engaging a body support bracket 39 of the left sub-frame member. The body panel is secured to the sub-frame member by bolting the mounting brackets 33 to the respective body support brackets 39 with bolts 22. A length spacer panel 20 is cut to cover a portion of the chassis between the cab 11 and the body panel 15.

As illustrated in FIG. 1, the body sub-frame assembly is assembled with two opposing sub-frame members 35 and 36 connected together with their respective sub-frame brace tubes 41 and 42 inserted into respective sub-frame brace sleeves 45. Each of the three sub-frame brace tubes 41 of the left sub-frame member 35 is inserted into one end of a sub-frame brace sleeve 45. Each of the three sub-frame brace tubes 42 of the right sub-frame member 36 is inserted into the other end of the sub-frame brace sleeve 45 opposite to a corresponding sub-frame brace tube 41. The sub-frame brace tubes 41,42 are inserted a predetermined distance into the sub-frame brace sleeves 45.

The sub-frame brace tubes 42 are fixed to the sub-frame rail 38 of the right sub-frame member 36, and the sub-frame brace tubes 41 are fixed to the sub-frame rail 37 of the left sub-frame member 35. The predetermined distance that the sub-frame brace tubes 41,42 are inserted into the sub-frame brace sleeves 45 is set such that the sub-frame rails 37 and 38 line up with the chassis rails 13 and 14, respectively. The sub-frame brace tubes are welded into the sub-frame brace sleeves in that position. The body sub-frame assembly is then ready for mounting on the desired chassis.

Figure 3:
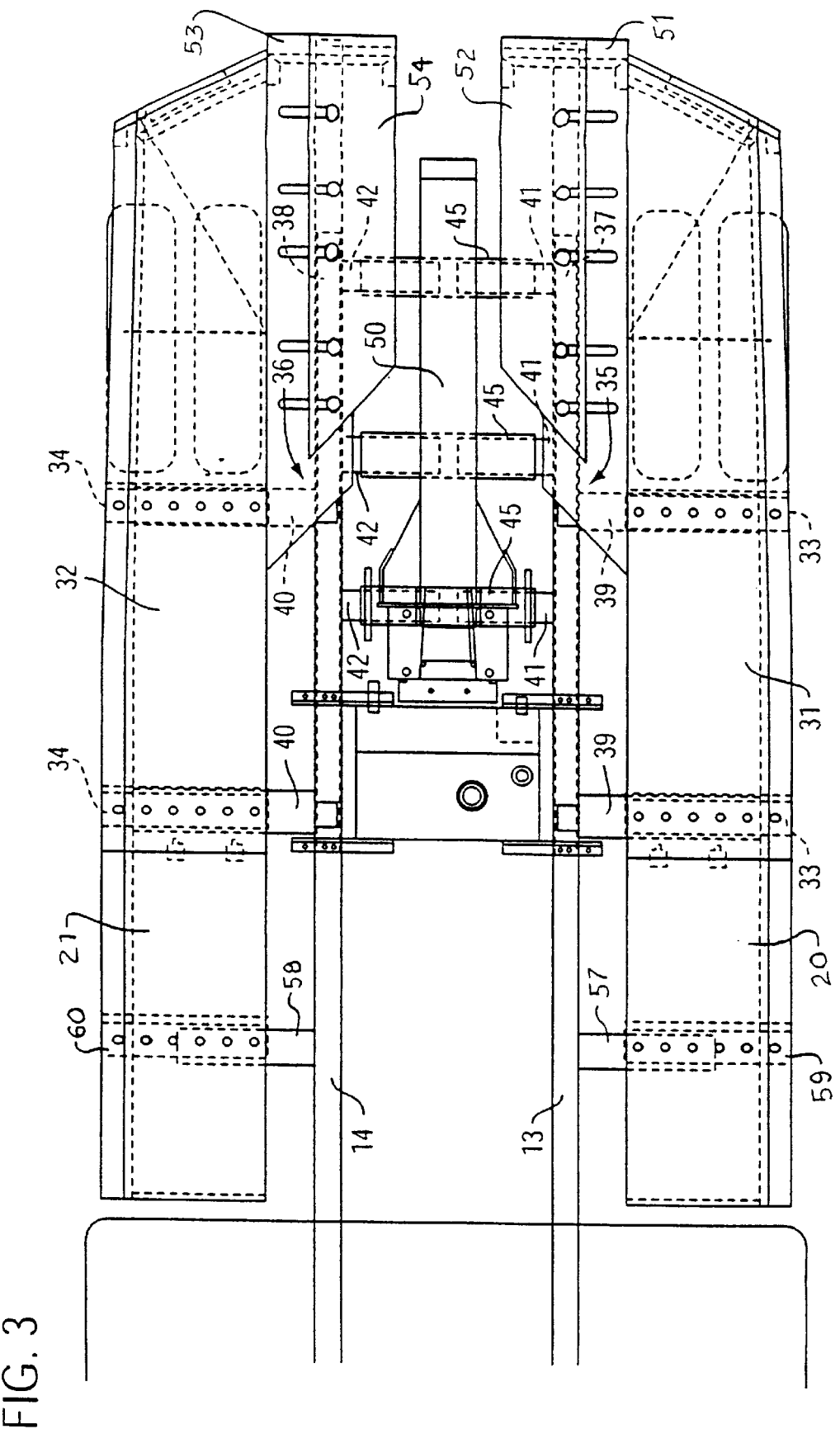
FIG. 3 illustrates a top view of the body panel assembly and body sub-frame assembly of an exemplary embodiment of the present invention, mounted on a narrow truck chassis, with component deck plates.

For example, comparing FIG. 1 to FIG. 3, the body sub-frame assembly of FIG. 1 is mounted on a wide truck chassis, compared to the body sub-frame assembly of FIG. 3 mounted on a narrower truck chassis. The sub-frame brace tubes 41,42 of the sub-frame members in FIG. 1 are partially inserted into the sub-frame brace sleeves 45, resulting in a wider positioning of the sub-frame rails 37 and 38 to line up with the wider configuration of chassis rails 13 and 14, respectively. Comparatively, the sub-frame brace tubes 41,42 of the sub-frame members in FIG. 3 are fully inserted into the sub-frame brace sleeves 45, resulting in a narrower positioning of the sub-frame rails 37 and 38 to line up with the narrower configuration of chassis rails 13 and 14, respectively. The sub-frame assembly is thereby adjustable to fit a variety of different chassis widths.

The body sub-frame assembly supports the left and right body panels 31 and 32 via the body support brackets 39 and 40, respectively. The body support brackets 39 are fixed to the left sub-frame rail 37 on the opposite side from the sub-frame brace tubes 41, and the body support brackets 40 are fixed to the right sub-frame rail 38 on the opposite side from sub-frame brace tubes 42. The mounting brackets 33 and 34 of the left and right body panels align with the respective body support brackets 33 and 34. The mounting brackets 33 and 34, and the body support brackets 39 and 40, each have a series of holes at a predetermined spacing along their length. The predetermined spacing is set such that the holes of a given mounting bracket line up with the holes of the corresponding body support bracket in a manner allowing for various lateral mounting positions for the body panel on the body sub-frame assembly. The various lateral positions are designed to accommodate a number of standard truck chassis and cab widths. Each body panel is positioned on the corresponding body support brackets at a desired lateral position with respect to the cab width and width between outer rear wheels, and bolted in that position.

For example, again comparing FIG. 1 to FIG. 3, the left and right body panels 31 and 32 of FIG. 1 are mounted on a wide truck chassis, compared to the left and right body panels 31 and 32 of FIG. 3 mounted on a narrower truck chassis. The mounting brackets 33 and 34 of the body panels in FIG. 1 are partially inserted over the respective body support brackets 39 and 40 of the respective sub-frame members 35 and 36, resulting in a wider positioning of the body panels with respect to the truck cab and chassis. Comparatively, the mounting brackets 33 and 34 of the body panels in FIG. 3 are almost fully inserted over the respective body support brackets 39 and 40 of the respective sub-frame members 35 and 36, resulting in a narrower positioning of the body panels with respect to the truck cab and chassis. A single universal body panel is thereby adjustable to fit truck chassis of a variety of widths, and is also readily removable for replacement or easy access to the chassis and drive train for repairs.

Once the left and right body panels are mounted on the body sub-frame assembly, left deck plates 51 and 52 are connected to each other in an overlapping fashion, as are right deck plates 53 and 54. The connected deck plate assemblies 51/52 and 53/54 are mounted to the top surfaces at the inner rear ends of the left and right body panels 31 and 32, respectively, as illustrated in FIG. 1. The amount of overlap between deck panels of a connected pair depends on the width of the particular truck chassis, further increasing the flexibility of fitting universal adjustable body panels on truck chassis of a variety of widths. Alternatively, single left and right deck plates can be cut to size in accordance with the chassis width, and mounted to the top surface at the inner rear ends of the left and right body panels 31 and 32, respectively.

The deck plates form a deck between the respective body panels 31 and 32 and the automobile lift assembly 50. The deck plates or deck plate assemblies can be bolted, welded, riveted, or otherwise fixed together and in place. Alternatively, as shown in FIG. 4, single deck plates 71 and 72, can be integrally provided as part of the respective body panels 31 and 32. The deck plates 71 and 72 are cut to size in accordance with the desired chassis width.

Further, left and right length spacer panels 20 and 21, respectively, are cut to size and mounted to the left and right body panels, covering spaces between the left and right body panels 31 and 32, and the truck cab 11. Body support brackets 57 and 58 are fixed to the outer sides of the left and right chassis rails 13 and 14, respectively. The body support brackets 57 and 58 align with mounting brackets 59 and 60 of the left and right length spacer panels 20 and 21, respectively. As with the mounting brackets and body support brackets of the body panels 31 and 32, the mounting brackets 59 and 60, and the body support brackets 57 and 58, each have a series of holes at a predetermined spacing along their length. The predetermined spacing is set such that the holes of a given mounting bracket line up with the holes of the corresponding body support bracket in a manner allowing for various lateral mounting positions for the body panel on the body sub-frame assembly. The various lateral positions are designed to accommodate a number of standard truck chassis and cab widths, and provide for alignment of the length spacer panels 20 and 21 with the respective left and right body panels 31 and 32.

Each length spacer panel is positioned on the corresponding body support bracket at a desired lateral position with respect to the respective body panel, and bolted in that position. Further, each length spacer panel is bolted to the respective body panel, as illustrated in FIGS. 1, 3, and 4. The length spacer panels thereby accommodate for a variety of truck chassis lengths upon which the universal adjustable body panels of the present invention can be mounted.

Of course, it should be understood that a wide range of modifications can be made to the exemplary embodiments described above. It is therefore intended that the foregoing detailed description be regarded as illustrative rather than limiting and that it be understood that it is the following claims, including all equivalents, which are intended to define the scope of this invention.

We claim:

1. An adjustable tow vehicle body sub-frame assembly for mounting on a one of plurality of tow vehicle chassis having different widths, and an adjustable body panel assembly for mounting on the body sub-frame assembly, the adjustable body sub-frame assembly comprising:

left and right sub-frame rails that mount on left and right chassis rails between the outer rear wheels, respectively, each sub-frame rail having at least a first engaging sub-frame element fixed thereto in a lateral direction to the respective chassis rail, and each sub-frame rail having at least one body support element fixed thereto in a lateral direction the respective chassis rail;

a second engaging sub-frame element having two connecting ends, the second sub-frame element connecting to the first sub-frame element of the left sub-frame rail at one connecting end, and connecting the first sub-frame element of the right sub-frame rail to the other connecting end; and the first sub-frame brace elements being connected at a predetermined distance to the second sub-frame brace element at a position such that each sub-frame rail aligns with the respective chassis rail, and the first sub-frame brace element secured to the second sub-frame brace element at that predetermined position, and the adjustable body panel assembly comprising: the body panel comprising:

at least one mounting element fixed to the body panel extending laterally to the body panel, and the one mounting element having spacing along its length;

the one mounting element aligning with the corresponding body support element fixed to the predetermined tow vehicle chassis, the one body support element extending laterally to the chassis, and having spacing along its length; and the body panel being mountable on the one body support element in one of a plurality of lateral positions, wherein in each such position the spacing of the one mounting element mate with the spacing of the body support element at one of a plurality of positions relative to said widths of the tow vehicle chassis rails.

2. The invention of claim 1, wherein one of said mounting element or said body support elements includes aligning elements at predetermined positions along its respective said spacing; and said mounting element and said body support element mate at said one of said predetermined positions of said element having said predetermined position.

3. The invention of claim 1, wherein said mounting element includes aligning elements at predetermined positions along said spacing, said body support element includes aligning elements at predetermined positions along said spacing; and said mounting element and said body support element mate and align at one of said predetermined positions of each element.

4. The invention of claim 1, further comprising at least one deck plate that mounts on a top surface at an inner rear edge of the left body panel, and at least one deck plate that mounts on a top surface at an inner rear edge of the right body panel, to cover portions of the chassis.

5. The invention of claim 1, further comprising a plurality of deck plates that mount together in an overlapping fashion to form two deck assemblies, one deck assembly mounts on a top surface at an inner rear edge of each of the left and right body panels to cover portions of the chassis, the deck plates of each of the deck assemblies overlap a predetermined amount in accordance with a width of the chassis.

6. The invention of claim 1, further comprising a pair of deck plates, one on a top surface at an inner rear edge of the left body panel, and another on a top surface at an inner rear edge of the right body panel, each covering a portion of the truck chassis, and each being cut to a size in accordance with a width of the chassis.

7. The invention of claim 1, further comprising a pair of length spacer panels, each being cut to size in accordance with a length of the truck chassis, and one being mounted in a space between a front end of the left body panel and a truck cab located at a front end of the truck chassis, and another being mounted in a space between a front end of the right body panel and the truck cab.

8. The invention of claim 1, wherein one of said first sub-frame elements or second sub-frame elements receives the other respective element.

9. The invention of claim 1, additionally including a plurality of first sub-frame elements, and a plurality of corresponding second sub-frame elements.

10. The invention of claim 1, wherein one of said first sub-frame elements or said second sub-frame elements is a either a tube or a sleeve, and the other of said sub-frame element is the other of said tube or sleeve of said sub-frame element, wherein said first and second sub-frame elements engage each other by the respective engagement of the tube and the sleeve.

11. The invention of claim 1, wherein said first sub-frame element is a tube, and said second sub-frame elements is a sleeve, wherein said first and second sub-frame elements engage each other by the engagement of the tube and the sleeve.

12. The invention of claim 1, additionally including a lift assembly comprising: a main boom mounted to the truck chassis at a first end of the main boom; and an extension boom mounted to a second end of the main boom at a first end of the extension boom.

13. A wrecker for towing a disabled vehicle, the wrecker comprising a tow vehicle chassis, a lift assembly, an adjustable body sub-frame assembly mounted thereon, and an adjustable body panel assembly;

the lift assembly comprising:
a main boom mounted to the truck chassis at a first end of the main boom; and
an extension boom mounted to a second end of the main boom at a first end of the extension boom;

the adjustable body sub-frame assembly comprising:
left and right sub-frame rails that mount on left and right chassis rails between the outer rear wheels, respectively, each sub-frame rail having at least a first engaging sub-frame element fixed thereto in a lateral direction to the respective chassis rail, and each sub-frame rail having at least one body support element fixed thereto in a lateral direction the respective chassis rail;
a second engaging sub-frame element having two connecting ends, the second sub-frame element connecting to the first sub-frame element of the left sub-frame rail at one connecting end, and connecting the first sub-frame element of the right sub-frame rail to the other connecting end; and
the first sub-frame brace elements being connected at a predetermined distance to the second sub-frame brace element at a position such that each sub-frame rail aligns with the respective chassis rail, and the first sub-frame brace element secured to the second sub-frame brace element at that predetermined position, and the adjustable body panel assembly comprising: the body panel comprising:
at least one mounting element fixed to the body panel extending laterally to the body panel, and the one mounting element having spacing along its length;
the one mounting element aligning with the corresponding body support element fixed to the predetermined tow vehicle chassis, the one body support element extending laterally to the chassis, and having spacing along its length; and
the body panel being mountable on the one body support element in one of a plurality of lateral positions, wherein in each such position the spacing of the one mounting element mate with the spacing of the body support element at one of a plurality of positions relative to said widths of the tow vehicle chassis rails.

14. A process for making a wrecker comprising:
(a) providing a tow vehicle having a chassis,
(b) providing an adjustable body sub-frame assembly, the adjustable body sub-frame assembly comprising:
left and right sub-frame rails that mount on left and right chassis rails between the outer rear wheels, respectively, each sub-frame rail having at least a first engaging sub-frame element fixed thereto in a lateral direction to the respective chassis rail, and each sub-frame rail having at least one body support element fixed thereto in a lateral direction the respective chassis rail;
a second engaging sub-frame element having two connecting ends, the second sub-frame element connecting to the first sub-frame element of the left sub-frame rail at one connecting end, and connecting the first sub-frame element of the right sub-frame rail to the other connecting end; and
the first sub-frame brace elements being connected at a predetermined distance to the second sub-frame brace element at a position such that each sub-frame rail aligns with the respective chassis rail, and the first sub-frame brace element secured to the second sub-frame brace element at that predetermined position,
(c) attaching the sub-frame assembly to said chassis;
(d) providing an adjustable body panel assembly comprising: the body panel assembly comprising:
at least one mounting element fixed to the body panel extending laterally to the body panel, and the one mounting element having spacing along its length;
the one mounting element aligning with the corresponding body support element fixed to the predetermined tow vehicle chassis, the one body support element extending laterally to the chassis, and having spacing along its length; and
the body panel being mountable on the one body support element in one of a plurality of lateral positions, wherein in each such position the spacing of the one mounting element mate with the spacing of the body support element at one of a plurality of positions relative to said widths of the tow vehicle chassis rails, and
(e) attaching the body panel to said sub-frame assembly.

15. The invention of claim 14, wherein additionally including: (f) providing a lift assembly attached to said chassis, the lift assembly comprising: a main boom mounted to the truck chassis at a first end of the main boom; and an extension boom mounted to a second end of the main boom at a first end of the extension boom.

* * * * *